US012676672B2

(12) United States Patent
Vitic et al.

(10) Patent No.: US 12,676,672 B2
(45) Date of Patent: Jul. 7, 2026

(54) FAST LOS DETECTION IN A COHERENT OPTICAL MODEM

(71) Applicant: Ciena Corporation, Hanover, MD (US)

(72) Inventors: Michael Vitic, Chelsea (CA); Scott Kuntze, Ottawa (CA); Ronald C. Hartman, Fitzroy Harbour (CA); Zhan Xu, Ottawa (CA)

(73) Assignee: Ciena Corporation, Hanover, MD (US)

( * ) Notice: Subject to any disclaimer, the term of this patent is extended or adjusted under 35 U.S.C. 154(b) by 282 days.

(21) Appl. No.: 18/624,944

(22) Filed: Apr. 2, 2024

(65) Prior Publication Data

US 2025/0309980 A1      Oct. 2, 2025

(51) Int. Cl.
　　*H04B 10/079*　　(2013.01)
　　*H04B 10/61*　　(2013.01)
(52) U.S. Cl.
　　CPC ..... *H04B 10/07955* (2013.01); *H04B 10/614* (2013.01); *H04B 10/616* (2013.01); *H04B 10/65* (2020.05)
(58) Field of Classification Search
　　None
　　See application file for complete search history.

(56) References Cited

U.S. PATENT DOCUMENTS

| | | | |
|---|---|---|---|
| 6,603,376 | B1 | 8/2003 | Handforth et al. |
| 10,811,279 | B2 | 10/2020 | Pelletier et al. |
| 10,830,638 | B2 | 11/2020 | Pelletier et al. |
| 10,908,474 | B2 | 2/2021 | Vitic et al. |
| 10,911,011 | B2 | 2/2021 | Luk et al. |
| 11,391,627 | B1 | 7/2022 | Vitic et al. |
| 11,404,596 | B1 | 8/2022 | Luk et al. |
| 11,650,475 | B2 | 5/2023 | Vitic et al. |
| 11,799,434 | B2 | 10/2023 | Luk et al. |
| 2006/0110157 | A1* | 5/2006 | Tritschler ............... H04B 10/00 398/22 |
| 2007/0280684 | A1* | 12/2007 | Onoda ............. H04B 10/07955 398/38 |
| 2011/0217045 | A1 | 9/2011 | Watson et al. |
| 2012/0051754 | A1* | 3/2012 | Sakamoto ............ H04B 10/616 398/115 |
| 2012/0063766 | A1 | 3/2012 | Matsukawa et al. |
| 2015/0229411 | A1 | 8/2015 | Takeda |
| 2019/0036601 | A1 | 1/2019 | Ray |

(Continued)

OTHER PUBLICATIONS

Jul. 8, 2025, International Search Report and Written Opinion for the International Patent Application No. PCT/US2025/021941.

*Primary Examiner* — Casey L Kretzer
(74) *Attorney, Agent, or Firm* — Baratta Law PLLC; Lawrence A. Baratta, Jr.

(57) ABSTRACT

A coherent optical modem is configured to support fast Loss of Signal (LOS) detection, e.g., <1 ms, and includes an Intradyne Coherent Receiver (ICR) with input power reporting circuitry configured to monitor one or more received optical signals; and processing circuitry communicatively coupled to the ICR and configured to receive a first interrupt from the input power reporting circuitry based on the input power reporting circuitry monitoring the one or more received optical signals, responsive to the first interrupt, prioritize detection of LOS in the processing circuitry, and, responsive to the detection of the LOS, provide a second interrupt to a host device associated with the coherent optical modem.

18 Claims, 11 Drawing Sheets

(56) References Cited

U.S. PATENT DOCUMENTS

| | | | |
|---|---|---|---|
| 2019/0305854 A1* | 10/2019 | Campos | H04B 10/61 |
| 2022/0179246 A1 | 6/2022 | Vitic et al. | |
| 2022/0336691 A1 | 10/2022 | Samani et al. | |
| 2022/0404680 A1 | 12/2022 | Jacques et al. | |
| 2023/0084020 A1 | 3/2023 | Poulin et al. | |
| 2023/0102304 A1 | 3/2023 | Latrasse et al. | |
| 2023/0305356 A1 | 9/2023 | Jacques et al. | |

* cited by examiner

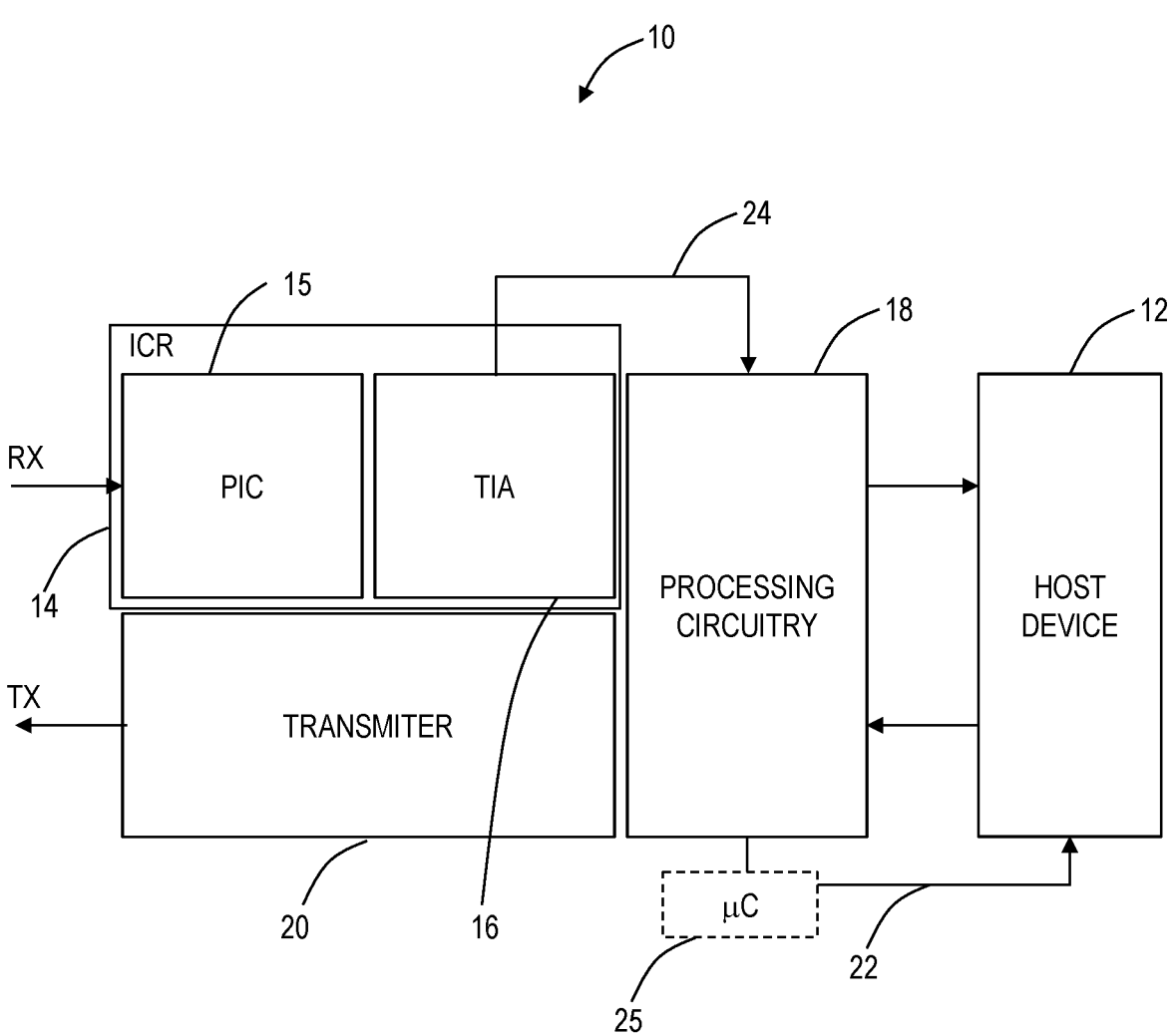
_FIG. 1_

*FIG. 5*
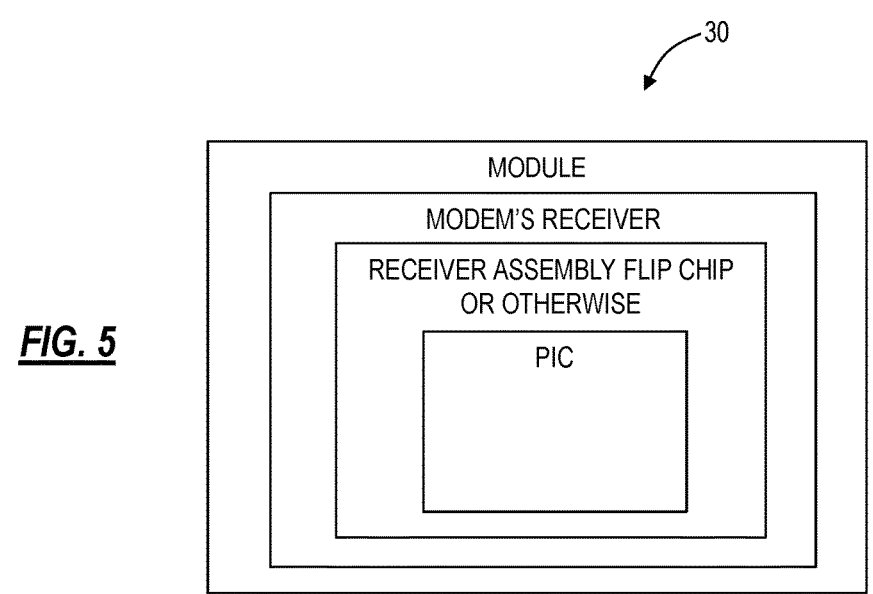
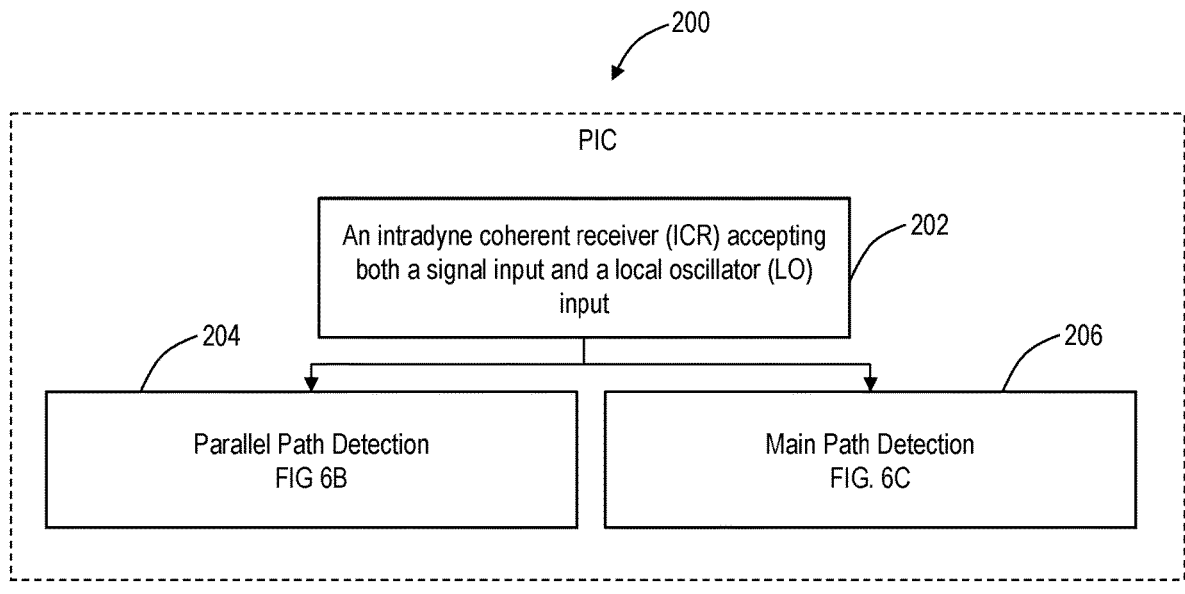
*FIG. 6A*

*FIG. 7*
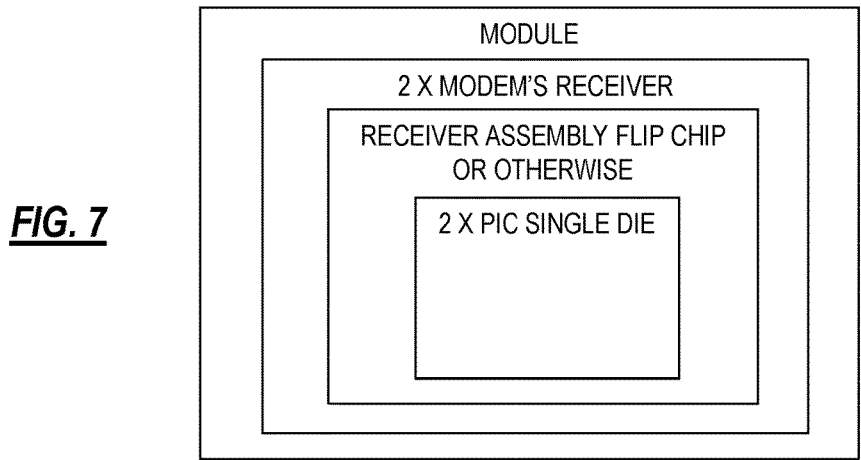
—300
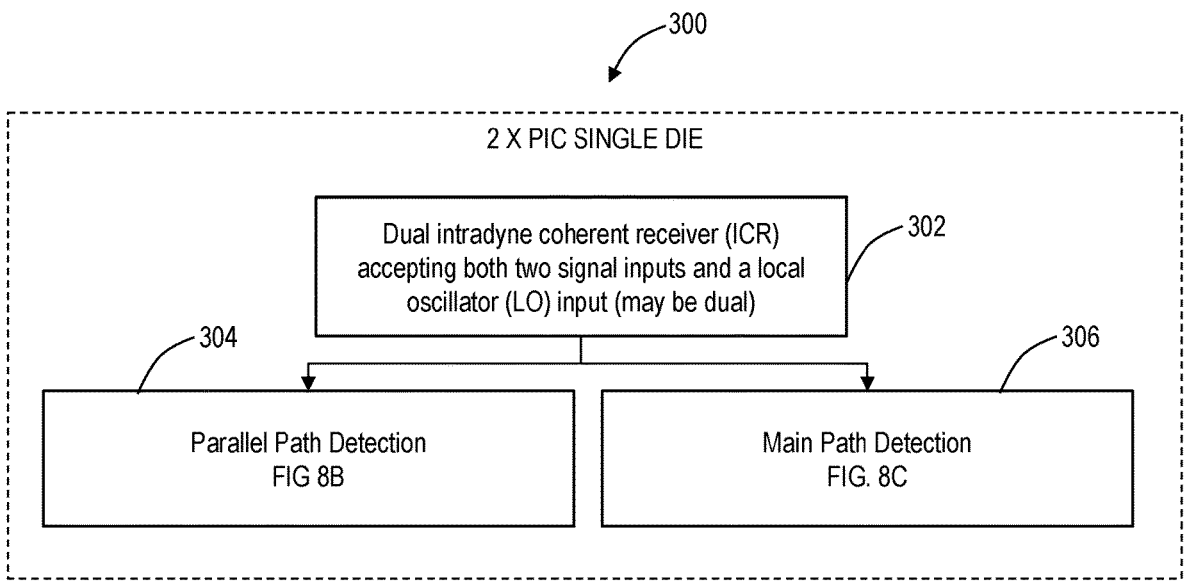
*FIG. 8A*

FAST LOS DETECTION IN A COHERENT OPTICAL MODEM

FIELD OF THE DISCLOSURE

The present disclosure relates generally to optical networking. More particularly, the present disclosure relates to systems and methods for fast Loss of Signal (LOS) detection in a coherent optical modem.

BACKGROUND OF THE DISCLOSURE

Optical communication links are fundamentally formed with an optical module, referred to as a modem, transceiver, etc. That is, a device configured to transmit and receive data optically and to interface the data electrically to a host system, such as a router, switch, network element, computing device, etc. The present disclosure refers to such device as a modem, including pluggable optical modules. There is a requirement for a modem to report Loss of Signal (LOS) to the host system as soon as possible, i.e., for the host system to deal with failures quickly. For example, the Quad Small Form Factor Pluggable (QSFP) Double Density (QSFP-DD) specification has a requirement for the Receiver (Rx) to assert LOS in a fast mode within 1 ms. In some implementations, optical transceivers use Intensity Modulation with Direct Detection (IMDD), such as with On-Off Keying (OOK), Pulse Amplitude Modulation (PAM), etc. Such IMDD transceivers can meet the <1 ms LOS as there is a direct correlation between received power and whether a signal is being received. That is, IMDD devices operate in relatively low noise environments and can rely on optical power detection to detect LOS. Modems that use coherent modulation, which operate in considerably worse noise environments, see interfering neighboring channels especially in gridless networks (without multiplexers and demultiplexers), do not have the same correlation of power with LOS as IMDD approaches. That is, LOS detection in coherent modems cannot rely simply on optical power detection and is performed in processing circuitry, i.e., a Digital Signal Processor (DSP). As such, conventional implementations for fast LOS in coherent modems are in excess of 1 ms.

BRIEF SUMMARY OF THE DISCLOSURE

The present disclosure relates to systems and methods for fast Loss of Signal (LOS) detection in a coherent modem. As described herein, fast LOS is around 1 ms or so, and conventional coherent modems simply cannot achieve such detection as it is performed in a DSP, after Analog-to-Digital Conversion (ADC) of optoelectronic power tap current, and subsequent to Serial Peripheral Interface (SPI) bus communication, which requires several firmware cycles to detect an adverse event leading to LOS, which typically exceeds 1 ms. To achieve sub-1 ms fast LOS detection in a coherent modem, the present disclosure includes a parallel detection path in the Intradyne Coherent Receiver (ICR) which raises an interrupt to the processing circuitry (DSP, Application Specific Integrated Circuit (ASIC), etc.) causing the processing circuitry to prioritize detection of signal loss on a fast cycle, i.e., <<1 ms. The parallel detection path is considerably faster than a conventional optical power detection path in a coherent modem as it does not require ADC conversion or communication over the SPI bus. That is, the present disclosure includes a first detection step in the coherent receiver which is used to raise an interrupt in the processing circuitry for a second detection step to prioritize detection of LOS based thereon. Even further, the parallel detection path can be integrated with existing input power reporting circuits in coherent modems. With the approach described herein, sub-1 ms fast LOS detection is possible with coherent modems, on par with IMDD approaches.

In an embodiment, a coherent optical modem includes an Intradyne Coherent Receiver (ICR) with input power reporting circuitry configured to monitor one or more received optical signals; and processing circuitry communicatively coupled to the ICR and configured to receive a first interrupt from the input power reporting circuitry based on the input power reporting circuitry monitoring the one or more received optical signals, responsive to the first interrupt, prioritize detection of Loss of Signal (LOS) in the processing circuitry, and, responsive to the detection of the LOS, provide a second interrupt to a host device associated with the coherent optical modem. The processing circuitry can be further configured to detect the LOS on a main detection path, which is after Analog-to-Digital Conversion (ADC) and with communication over a bus, the first interrupt from the input power reporting circuitry providing a parallel detection path that is faster than the main detection path. The parallel detection path can include the second interrupt being provided within 1 ms of the LOS.

The input power reporting circuitry can include current mirrors, transimpedance amplifiers, and comparators. The input power reporting circuitry can be further configured for optical power reporting from the ICR. The input power reporting circuitry can include current mirrors to duplicate photocurrent for use in the optical power reporting and raising the first interrupt. The one or more received optical signals can include dual polarization signals with an X and Y polarization. The input power reporting circuitry can monitor each of the X and Y polarization. The first interrupt can include an X polarization LOS interrupt and a Y polarization LOS interrupt, and the processing circuitry can be configured to prioritize the detection of the LOS based accordingly. The coherent optical modem can be in a pluggable module and the second interrupt is provided to the host device via a hardware pin or fast communication bus, for network protection applications by the host device.

In another embodiment, a method, implemented by processing circuitry in a coherent optical modem includes, responsive to monitoring power of one or more received optical signals in an Intradyne Coherent Receiver (ICR) via input power reporting circuitry, receiving a first interrupt from the input power reporting circuitry; responsive to the first interrupt, prioritizing detection of Loss of Signal (LOS); and, responsive to the detection of the LOS, providing a second interrupt to a host device associated with the coherent optical modem. The method can further include detecting the LOS on main detection path, which is after Analog-to-Digital Conversion (ADC) and with communication over a bus, the first interrupt from the input power reporting circuitry providing a parallel detection path that is faster than the main detection path.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a block diagram of a coherent optical modem.

FIG. 5 is a logical view of components in the 1x800ZR receiver for implementing various functions therein, including the fast LOS detection.

FIGS. 6A to 6C are flow diagrams of a fast LOS detection process implemented in the 1x800ZR receiver, as well as illustrating the associated components performing such functions.

FIG. 7 is a logical view of components in the 2x800LR receiver for implementing various functions therein, including the fast LOS detection.

FIGS. 8A to 8C are flow diagrams of a fast LOS detection process implemented in the 2x800LR receiver, as well as illustrating the associated components performing such functions.

DETAILED DESCRIPTION OF THE DISCLOSURE

Figure 2:
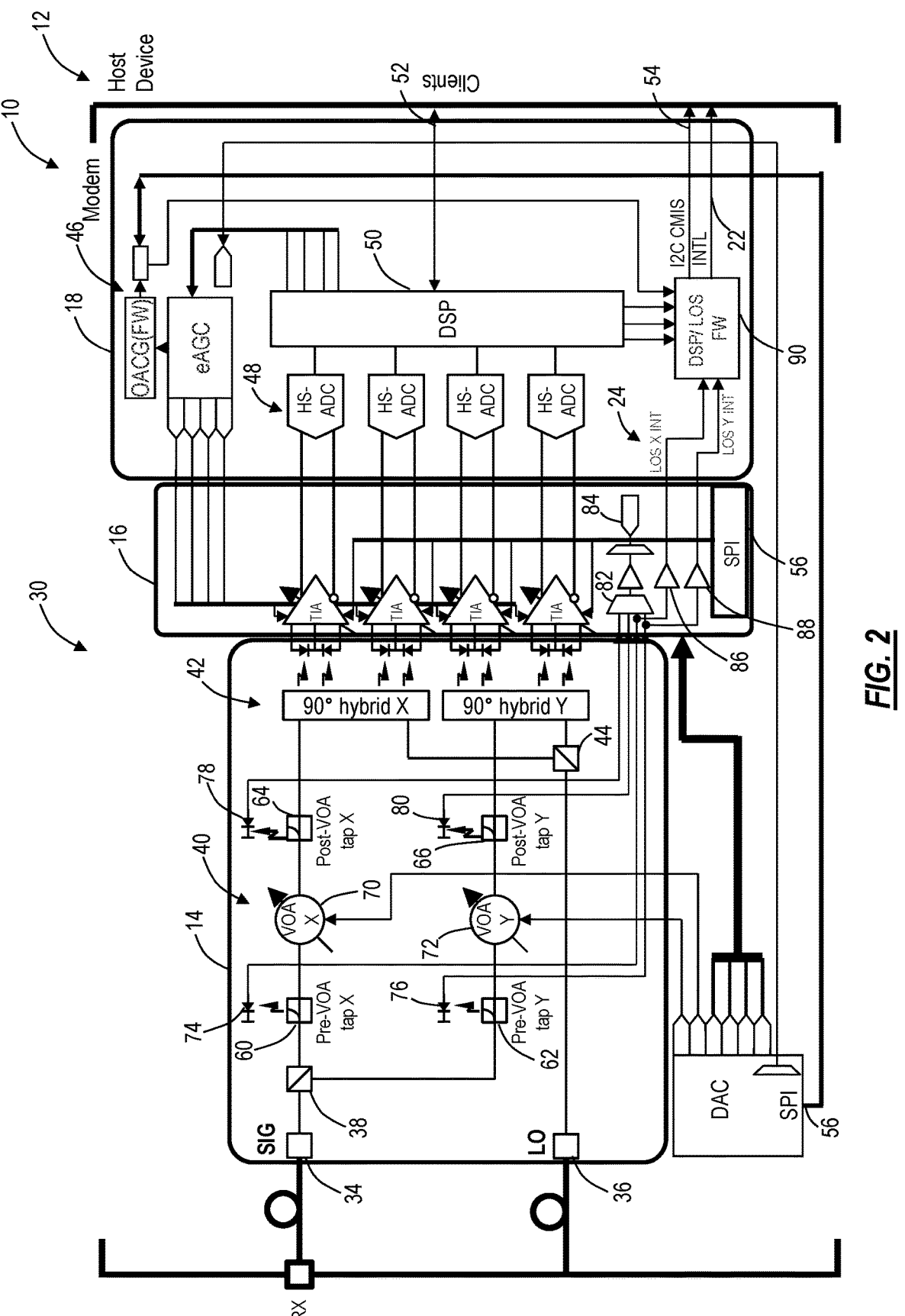
FIG. 2 is a circuit diagram of an example 1x800ZR receiver for illustrating functionality of the fast LOS in the coherent optical modem of FIG. 1.

Again, the present disclosure relates to systems and methods for fast Loss of Signal (LOS) detection in a coherent optical modem. Advantageously, the fast LOS approach described herein enables a coherent optical modem to detect and report LOS in less than 1 ms, which is a requirement for network protection switching applications.
Coherent Optical Modem FIG. 1 is a block diagram of a coherent optical modem 10. In particular, FIG. 1 is a functional diagram of the coherent modem 10, and those skilled in the art will recognize various physical embodiments are contemplated. Also, those skilled in the art will appreciate the coherent modem 10 is configured to receive (RX) and transmit (TX) optical signals from an adjacent coherent modem (not shown) to form a bidirectional communication link. The coherent modem 10 is configured to operate in a host device 12. The host device 12 can be a switch, router, computing device, network element, etc. The coherent modem 10 can be a pluggable optical module, an on-board optical module, an optical subassembly, etc. Also, those skilled in the art will appreciate other terms may be used to refer to the coherent modem 10, such as a transceiver, transmitter/receiver, optical module, transponder, etc.; all of these are contemplated herewith.

Logically, the coherent optical modem 10 includes a coherent receiver and a coherent transmitter. The coherent receiver includes an Intradyne Coherent Receiver (ICR) 14 which includes a Photonic Integrated Circuit (PIC) 15 and a Transimpedance Amplifier (TIA) 16. Noted, for the ICR 14, some use the term Intradyne Coherent Receiver while others use the term Integrated Coherent Receiver; those skilled in the art will recognize while the term Intradyne is used herein, the present disclosure contemplates either one. Generally, the ICR 14 is configured to receive (RX) an optical signal and perform demodulation thereof. The ICR 14 with the PIC 15 mixes the incoming optical signal with a Local Oscillator (LO) laser within the same optical frequency (or very close to it) in a process known as coherent detection. This mixing occurs in an optical hybrid, which combines the phases of the signal and LO light in such a way that it allows the direct detection of both the phase and amplitude of the optical field. The output from the optical hybrid in the PIC 15 is then converted into electrical signals by photodiodes connected to the TIA 16, which are processed to recover the transmitted data. The optical modem 10 also includes a transmitter 20 configured to modulate a corresponding optical signal for transmission (TX). The transmitter 20 includes a PIC, driver, etc. Note, the PIC in the transmitter 20 can be the same or separate as the PIC 15, and details of the transmitter 20 are omitted as the present disclosure focused on the coherent receiver. Collectively, the output in the coherent receiver from the TIA 16 connects to processing circuitry 18, and the input to the coherent transmitter connects to the processing circuitry 18.

The processing circuitry 18 can include an ASIC or the like that includes a DSP component. Also, practical implementations may include a single chip, i.e., circuit, for both the coherent receiver and the coherent transmitter. Of course, any approach is contemplated with the processing circuitry 18.

In an embodiment, the coherent optical module 10 can be in pluggable form factor, such as, e.g., QSFP-DD, Octal SFP (OSFP), OSFP extra Dense (OSFP-XD), and the like. These define a physical form factor for all of the components in the coherent optical module 10, such as for use in the host device 12. That is, when the coherent optical module 10 is in a given form factor, e.g., QSFP-DD, then it is operable in any host device 12 supporting such form factor. Of note, the physical form factor does not necessarily specify the optical interface, i.e., the QSFP-DD is not limited to coherent optics, or even to a specific data rate. However, the present disclosure relates to coherent optics implementations.

In another embodiment, the coherent optical module 10 can conform to a coherent optical interface specification, such as, e.g., 400ZR, 400ZR+, 1x800ZR, 2x800LR, 1600ZR, and the like, including variants thereof. The coherent optical interface specification standardizes the implementation of coherent optical interface that can support high data rates. These example specifications are part of the OIF (Optical Internetworking Forum) coherent interface standards. Again, when the coherent optical module 10 conforms to a given optical interface specification, then it is optically operable with a corresponding coherent optical module that supports the given optical interface specification.

These ZR and LR specifications are for data center interconnect applications, where the coherent optical modem 10 are supported in the host device 12 as a switch, router, etc. to connect to a corresponding switch, router, etc. The numerical values refer to the bandwidth, e.g., 800ZR relates to 800 Gbps, and the letters reference to the distances, e.g., ZR indicates it is optimized for applications requiring transmission over distances that can typically range up to 80-120 kilometers without the need for optical amplification or regeneration, LR indicates a shorter distance, such as up to 10 kilometers optimized for longer-distance transmission within campus, data center interconnects, or metropolitan area networks.

While the present disclosure uses QSFP-DD as an example form factor and 1x800ZR and 2x800LR as an example coherent optical interface specification, those skilled in the art will recognize the various techniques and circuits described herein can apply to any form factor with any coherent optical interface approach. This can include non-standardized implementations as well.
Fast LOS The present disclosure relates to fast LOS in the coherent receiver in the coherent optical modem 10. As described herein, fast LOS means the ability for the coherent receiver to detect LOS in a short time period, e.g., 1 ms or less. For example, in the QSFP-DD specification, there is a RxLOS Assert Time, specified at 100 ms, as well as an optional fast mode of 1 ms. Network operators, especially in data center interconnect applications, rely on a 'fast LOS'<1 ms for network protection switching. Fast LOS is typically defined as the Rx input signal on any optical port becoming equal to or less than the level required to assert LOS. Such an 'event' can occur when a fiber is either broken or removed. The event can be other failures that result in a sudden drop of optical power, e.g., operator error, adjacent modem TX failure, etc. The network operator will then choose if the outputs to the shall be squelched. Typically, a coherent modem will continue to transmit data until Loss of Frame (LOF) or Loss of Payload (LPL). In an embodiment, the term fast LOS means the RxLOS Assert Time (optional fast mode) or similar. The fast LOS is designed to quickly identify when an optical signal is lost or below a certain threshold, which is crucial for maintaining the reliability and performance of high-speed data communications networks.

The coherent optical modem 10 can include an interrupt (INTL) pin 22 which is used to tell the host device 12 that an interrupt has been set for adverse events such as LOS, LOF, Loss of Clock (LOC), LPL, etc. The coherent optical modem 10, such as in pluggable module form factors, have complex control loops to control the DSP, transmitter, laser and receiver, so that if an adverse event such that a signal loss event has occurred it may take several processor scheduler time slices sequencing the interrogation of hardware, processing of results before this event is assessed and an interrupt is issued to the host device 12. With conventional implementations, if an adverse event occurs, it may take >2 ms for an interrupt to be raised on the INTL pin 22, such as on a QSFP type module. In some embodiments, there is an optional microcontroller 25 between the processing circuitry 18 and the host device 12, with the INTL pin being connected therebetween. Also, while the INTL pin 22 is described on the QSFP type module, the present disclosure contemplates similar pins on other types of modules, such as OSFP and the like.

Specifically, in conventional coherent modem implementations, there are firmware loops for the DSP, Tx and Rx control, etc., and some of them are quite laborious and take a significant amount of time, in the event that there is a LOS, LOF, etc. coming from the Rx power detector (DSP) or the framing indicators, the firmware just does not get around to it in time to meet 1 ms.

For comparison, in an IMDD optical module, e.g., OOK, PAM4, etc., it is possible to include hardware implementations for LOS, such as based on Optical Modulation Amplitude (OMA) power detection or average power detection. For example, OMA power detection can be at an input to a Clock and Data Recovery (CDR), or sometimes at an interstage within the TIA, and the average power (e.g., Direct Current (DC) photocurrent) can be inside the TIA. For fast LOS, MDD optical modules can get away with a Root Mean Square (RMS) or peak detector (note these only have a bandwidth of 3-9 GHz at best) and since their signaling has a low crest factor (Peak-to-Peak (P2P)/RMS) the RMS detector is a fairly good representation of the total modulated spectrum coming in especially since the RX 'sees' only one TX.

For coherent optical interfaces, LOS is not raised as long as traffic is running. Coherent optical interfaces, in particular ones which are gridless (also sometimes referred to as colorless) and the channels are packed tightly together, the RX sees adjacent channels, and this is where there is a need to rely on channel power detector in the processing circuitry 18 (DSP) to not only report the power, but also as part of fast Automatic Gain Control (AGC) loops (fast Digital-to-Analog Converters (DACs) and fast analog gain control on the TIA 16) for transient control. This implementation is far more accurate/robust than relying on the TIA's power detector and AGC and having a feedback loop over SPI—remember the power detector may only have ⅒ the bandwidth of the received spectrum (e.g., 60-70 GHz), which is highly dispersed and has a Peak-to-Peak (P2P)/RMS>7.

Fast LOS in a Coherent Optical Modem

To support fast LOS in the coherent optical modem 10, the present disclosure includes a parallel detection path on the ICR 14 which is used to raise another interrupt 24 to the processing circuitry 18, to tell the processing circuitry 18 to prioritize detection of LOS. In an embodiment, the parallel detection path can utilize existing in-line optoelectronic taps in the ICR 14, which are typically used for optical power reporting, and include current mirrors, transimpedance amplifiers, and comparators. This parallel detection path is considerably faster than the conventional optical-power detection path because the novel parallel path requires no ADC conversion and no communication over a SPI bus to the host ASIC.

In the event the optical power drops abruptly below a pre-set threshold, the hardware LOS interrupt 24 is issued to the processing circuitry 18 via a hardware pin or fast communication bus, such as I2C, I3C, and the like. The hardware LOS interrupt 24 is issued at a high priority in the interrupt stack (vector), such as in the ASIC's microcontroller 25 (MCU) (see, FIG. 8), prioritizing the detection of signal loss (DSP's channel power detector), and framing indicators LOF and LPL, on a fast cycle <<1 ms and issuing an interrupt to the module's INTL pin 22 if LOF or LPL is detected. The parallel detection path issues a high priority interrupt 24 to get the firmware to immediately arbitrate and issue an LOS, without sacrificing modem performance and robustness. In an embodiment, the interrupt 24 can be based on an OR gate from LPL, LOC, and LOF. The interrupt 24 can also be sent to the microcontroller 25, or directly to the host device 12. Those skilled in the art will appreciate there can be various implementations, all of which are contemplated herewith.

Example Implementations—1x800ZR, 2x800LR

Figure 3:
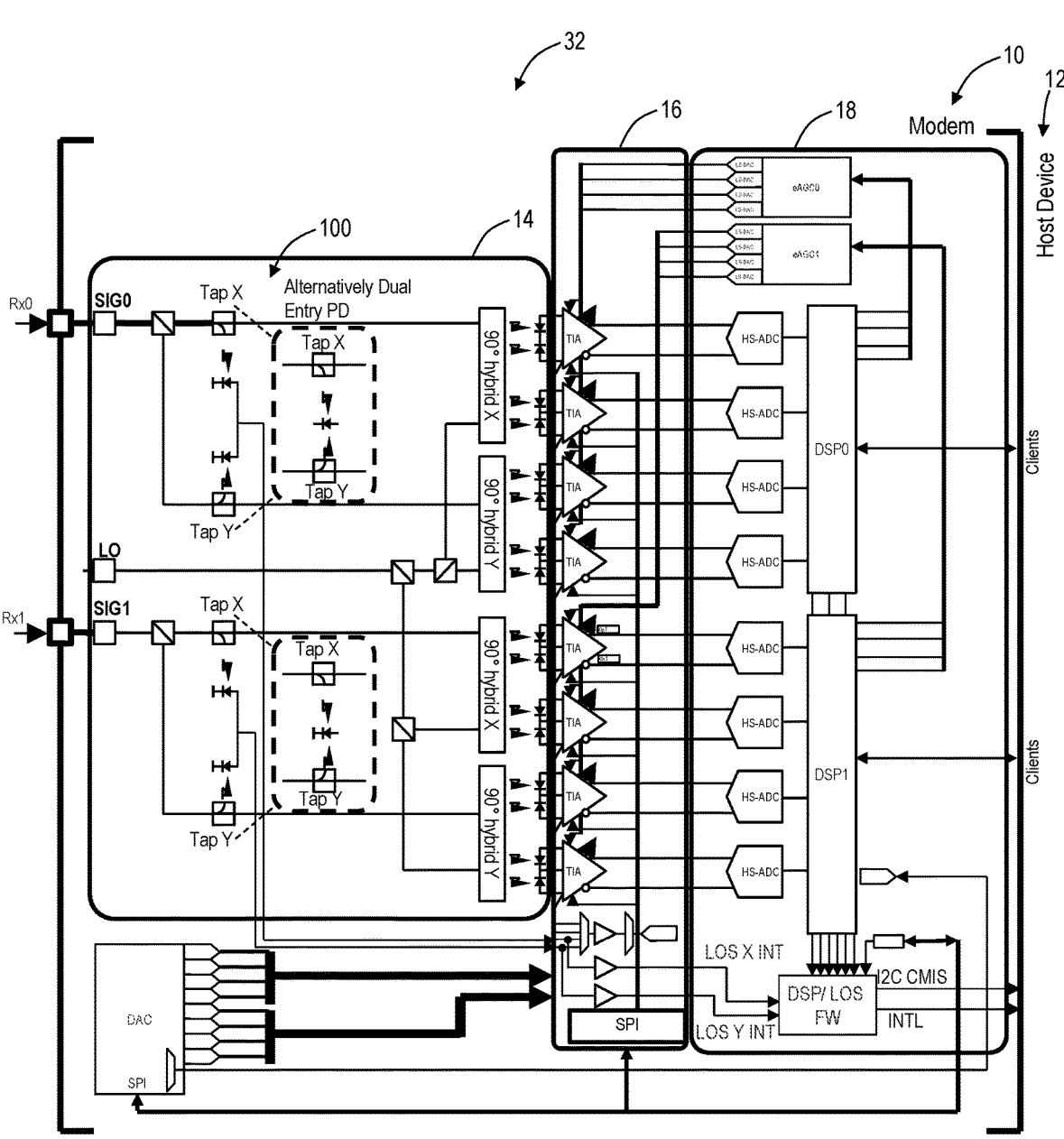
FIG. 3 is a circuit diagram of an example 2x800LR receiver, also for illustrating functionality of the fast LOS in the coherent optical modem of FIG. 1.

FIG. 2 is a circuit diagram of an example 1x800ZR receiver 30 for illustrating functionality of the fast LOS in the coherent optical modem 10. FIG. 3 is a circuit diagram of an example 2x800LR receiver 32, also for illustrating functionality of the fast LOS in the coherent optical modem. Again, these example embodiments are presented for illustration purposes only, as well as only focusing on the components in the coherent optical modem 10, and particularly in the coherent receiver, focused on the fast LOS approach. Again, other coherent optical interfaces, form factors, etc. are contemplated herewith.

With reference to FIG. 2, the 1x800ZR receiver 30 includes the ICR 14, the TIA 16, and the processing circuitry 18. The 1x800ZR receiver 30 includes a signal (SIG) input 34, along with an LO input 36, in the ICR 14. For example, the inputs 34, 36 can include Spot Size Converters (SSCs). The SIG input is split into two polarizations, X and Y, via a Polarization Rotator Splitter (PRS) 38, followed by an input power reporting circuit 40, and then the different polarizations are connected to an optical hybrid 42, which is also connected to the LO via a 50/50 splitter 44. Outputs of the optical hybrid 42 are connected to the TIA 16 which is configured to amplify the photocurrent from the high-speed photodetectors, voltage amplitude output of the TIA 16 is based on an Automatic Gain Control (AGC) loop 46. Outputs of the TIA 16 connected to high-speed ADCs 48 in the processing circuitry 18 which provide digital signals to a DSP 50 for processing. The DSP 50 ultimately connects client signals 52 to the host device 12, along with a management interface 54, such as an Inter-Integrated Circuit (I2C) using the Common Management Interface Specification (CMIS), and the INTL pin 22. There is also an SPI bus 56 for various control functions. In other embodiments, the fast LOS could occur across other interfaces as well, such as Improved Inter-Integrated Circuit (I3C), which is considerably faster than I2C. That is, those skilled in the art will recognize I2C is merely one embodiment, and others are contemplated.

The input power reporting circuit 40 includes power taps 62, 64, 66, 68, before and after Variable Optical Attenuators (VOAs) 70, 72. The power taps 60, 62 are on the X and Y polarizations before the VOAs 70, 72, with the VOA 70 on the X polarization and the VOA 72 on the Y polarization. The power taps 64, 66 are on the X and Y polarizations after the VOAs 70, 72. The power taps 60, 62, 64, 66 connect to photodetectors 74, 76, 78, 80, respectively. Outputs of the photodetectors 74, 76, 78, 80 are aggregated together via a current multiplexer (IMUX) 82, for reporting power, via a low-speed ADC 84, and there is a variable gain Transimpedance Amplifier (TZA) between IMUX 82 and the ADC 84.

For fast LOS detection, one or more of the Outputs of the photodetectors 74, 76, 78, 80 are amplified 86, 88 and go through a comparator which has a set threshold and hysteresis, and provided for the hardware LOS interrupt 24 to the processing circuitry 18, such as to DSP/LOS firmware (FW) 90 for prioritizing LOS detection in the processing circuitry 18 and raising the INTL pin 22, if appropriate.

The 1x800ZR receiver 30 supports a single 800ZR wavelength, with dual polarizations, X and Y. In this example, the outputs of the photodetectors 74, 76 are provided to the amplifiers 86, 88, to provide two LOS interrupt signals 24, an LOS X interrupt and an LOS Y interrupt. The DSP/LOS FW 90 can implement prioritized detection of LOS based on either interrupt, as well as focus on the specific polarization, e.g., detect LOS on the X polarization based on the LOS X interrupt.

With reference to FIG. 3, the 2x800LR receiver 32 supports two 800LR wavelengths, supporting 1600 Gbps, with two optical signals, each having dual polarizations, X and Y. Note, the 2x800LR receiver 32 has similar components as the 1x800ZR receiver 30 in the ICR 14, the TIA 16, and the processing circuitry 18, except twice the components to support two optical signals, SIG0, SIG1, with dual polarizations. The ICR 14 includes an input power reporting circuit 100 with a tap X, Y, for each SIG0, SIG1, and associated photodiodes for connecting to the current multiplexer, for power reporting. In an alternative embodiment, the input power reporting circuit 100 can support dual entry photodetector.

Current Mirrors

Figure 4:
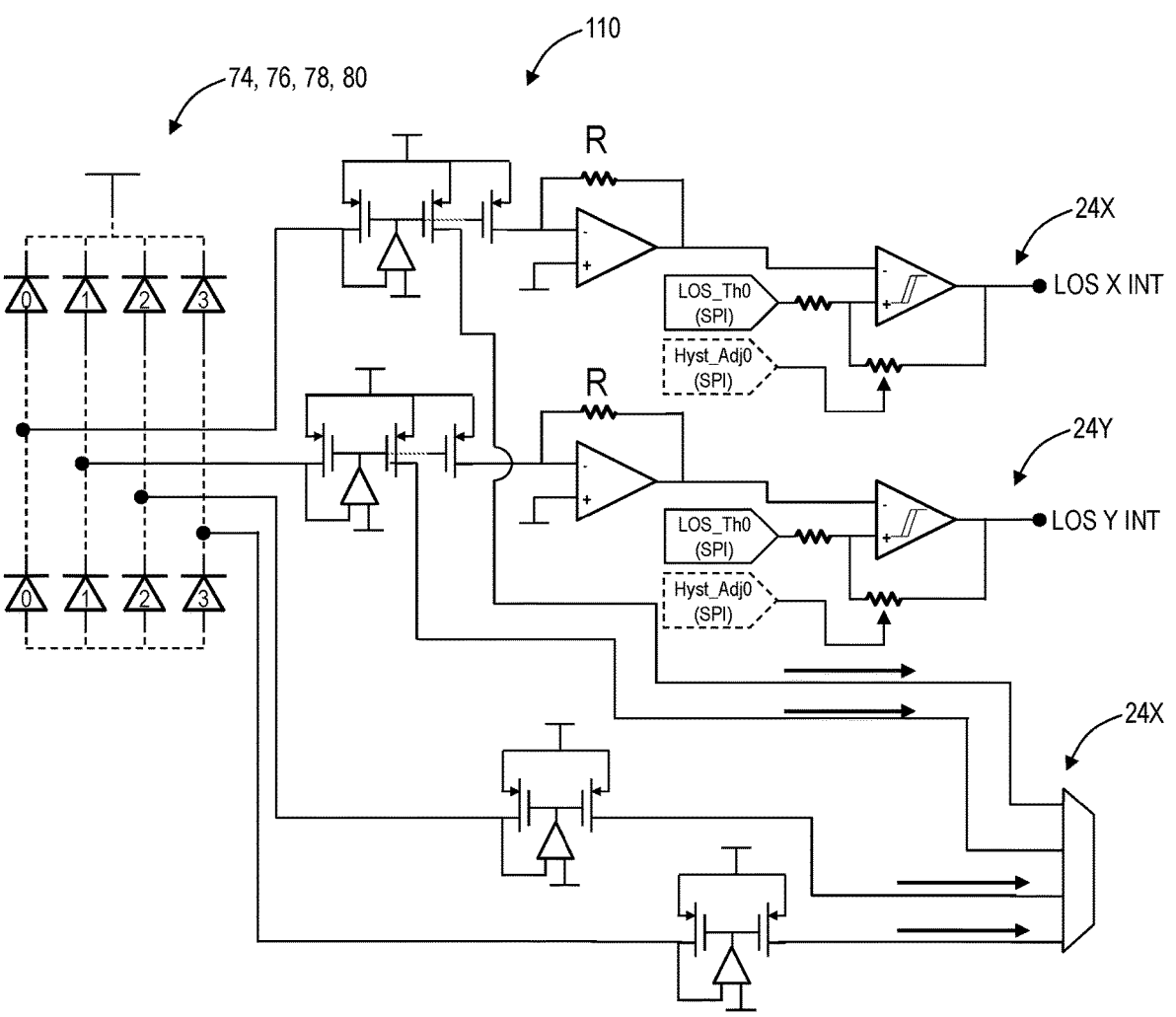
FIG. 4 is a circuit diagram of a portion of the input power reporting circuits in FIGS. 2 and 3 illustrating current mirrors.

FIG. 4 is a circuit diagram of a portion of the input power reporting circuits 40, 100 illustrating current mirrors 110. As noted above, in some embodiments, the input power reporting circuits 40, 100 can utilize existing power reporting circuits in the ICR 14. However, there is a desire to avoid using excess current for these functions, to ensure fidelity of the received optical signal, in further processing. As such, the use of current mirrors prevents such problems.

Functional Implementation—1x800ZR

Figure 6B:
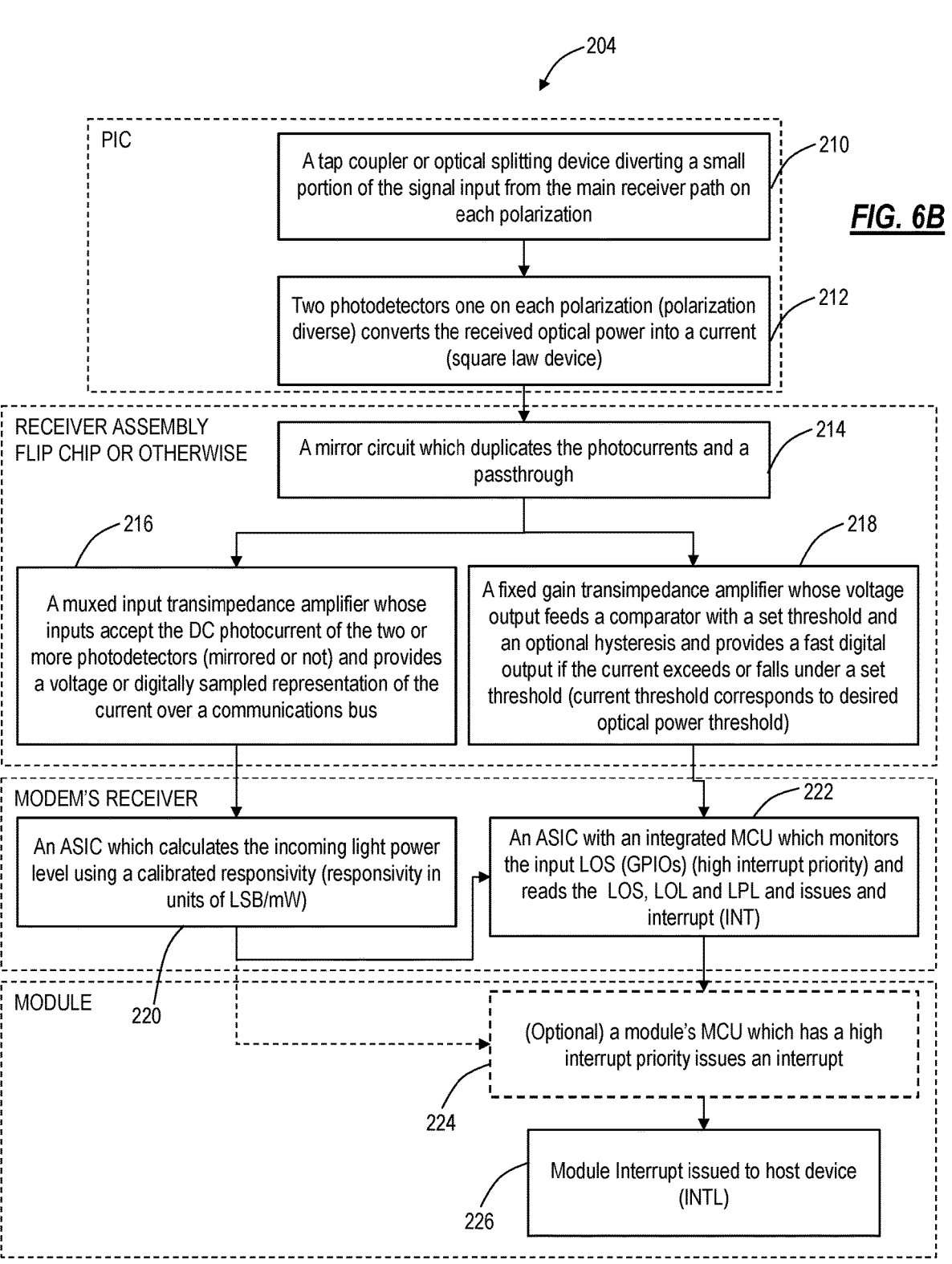
Figure 6C:
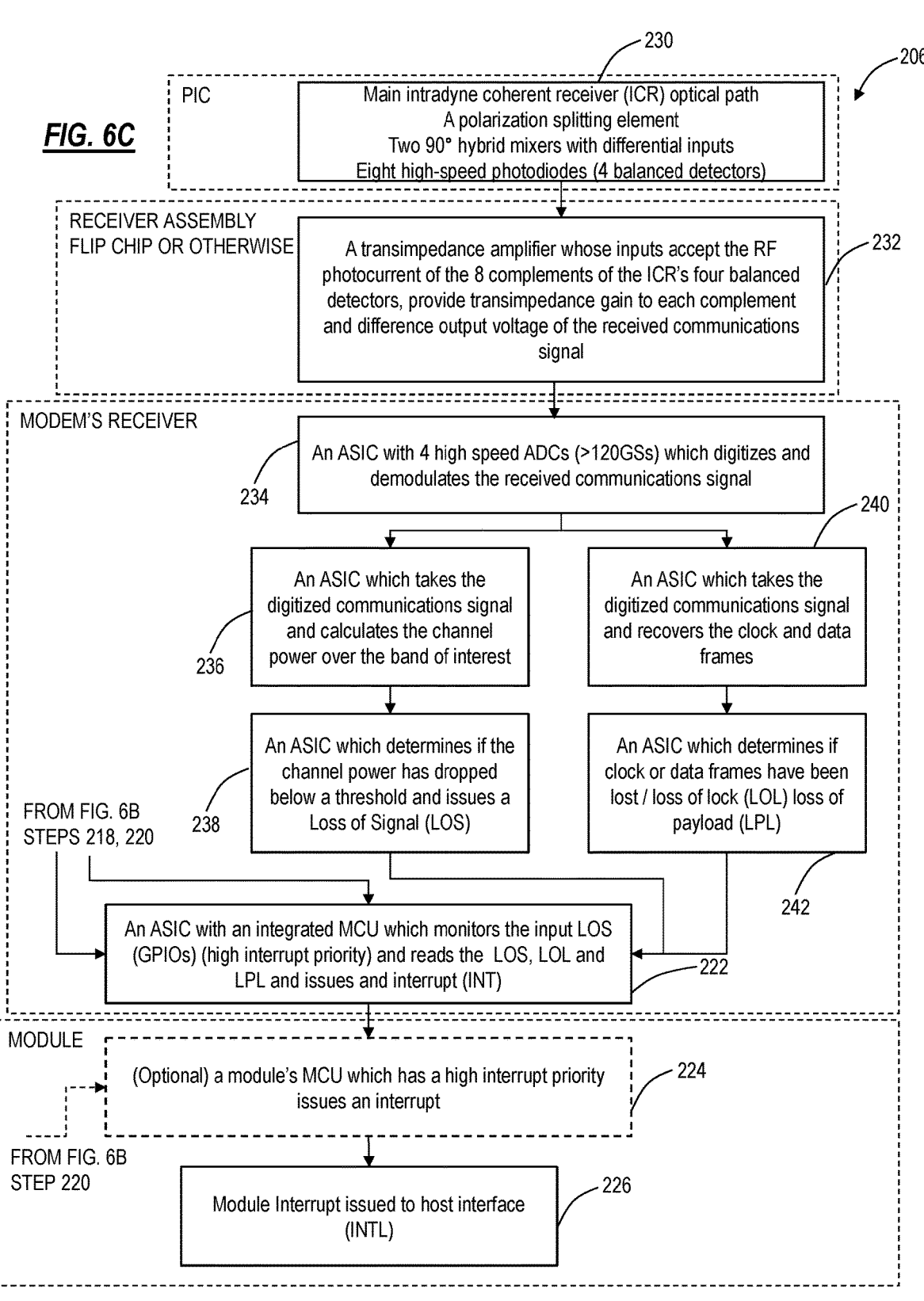

FIG. 5 is a logical view of components in the 1x800ZR receiver 30 for implementing various functions therein, including the fast LOS detection. FIGS. 6A to 6C are flow diagrams of a fast LOS detection process 200 implemented in the 1x800ZR receiver 30, as well as illustrating the associated components performing such functions. The 1x800ZR receiver 30 includes a silicon photonics chip, PIC, optical assembly, a receiver assembly flip chip or the like, the modem's receiver, and the module itself, connected to the host device 12. The fast LOS detection process 200 includes the ICR 14 accepting both a signal input and an LO input (step 202), and then proceeds to a parallel path detection 204, illustrated in FIG. 6B, and main path detection 206, illustrated in FIG. 6C.

With reference to FIG. 6B, the parallel path detection 204 includes, in the silicon photonics chip, a tap coupler or optical splitting device, diverting a small portion of the signal input from the main receiver path on each polarization (step 210), and two photodetectors, one on each polarization for polarization diversity, converting the received optical power into a current (i.e., a square law device) (step 212). Next, in the receiver assembly flip chip or otherwise, there is a mirror circuit (current mirror) which duplicates the photocurrents and a passthrough, so that there are two outputs of this step, with the same photocurrent (step 214).

One output of the step 214 is provided to a muxed input transimpedance amplifier whose inputs accept the DC photocurrent of the two or more photodetectors (mirrored or not) and provides a voltage or digitally sampled representation of the current over a communications bus (step 216). The other output of the step 214 is provided to a fixed gain transimpedance amplifier whose voltage output feeds a comparator with a set threshold and optional hysteresis and provides a fast digital output if the current exceeds or falls under a set threshold (current threshold corresponds to desired optical power threshold) (step 218).

The output of the step 216 is provided to the processing circuitry 18 (e.g., ASIC) which calculates a calibrated responsivity (such as in units of LSB/mW) (step 220). The output of both steps 218, 220 are used by the processing circuitry 18 with a MCU to monitor the input LOS for a high priority interrupt, e.g., a General-Purpose Input-Output (GPIO), which reads the LOS, LOL, and LPL and issues an interrupt (step 222). Optionally, the MCU has a high interrupt priority issues an interrupt (step 224). Finally, based on the fast LOS, the module interrupt is issued to the host device (step 226).

With reference to FIG. 6C, the main path detection 206 includes a main ICR optical path, with a polarization splitting element, two 90° hybrid mixers with differential inputs, and eight high-speed photodiodes (4 balanced detectors) (step 230), in the silicon photonics. Next, a transimpedance amplifier whose inputs accept the Radio Frequency (RF) photocurrent of the eight complements of the ICR's four balanced detectors, provide transimpedance gain to each complement and difference output voltage of the received communications signal (step 232).

In the modem's receiver, the processing circuitry with four high-speed ADCs (e.g., >120 GSs) digitizes and demodulates the received communications signal (step 234). The processing circuitry takes the digitized communications signal and calculates the channel power over the band of interest (step 236), and determines if the channel power has dropped below a threshold and issues a Loss of Signal (LOS)

(step 238). Also, after the step 234, the processing circuitry takes the digitized communications signal and recovers the clock and data frames (step 240), and determines if clock or data frames have been lost/loss of lock (LOL) loss of payload (LPL) (step 242). Subsequent to steps 238, 242, the main path detection 206 proceeds to step 222.

Functional Implementation—2x800LR

Figure 8B:
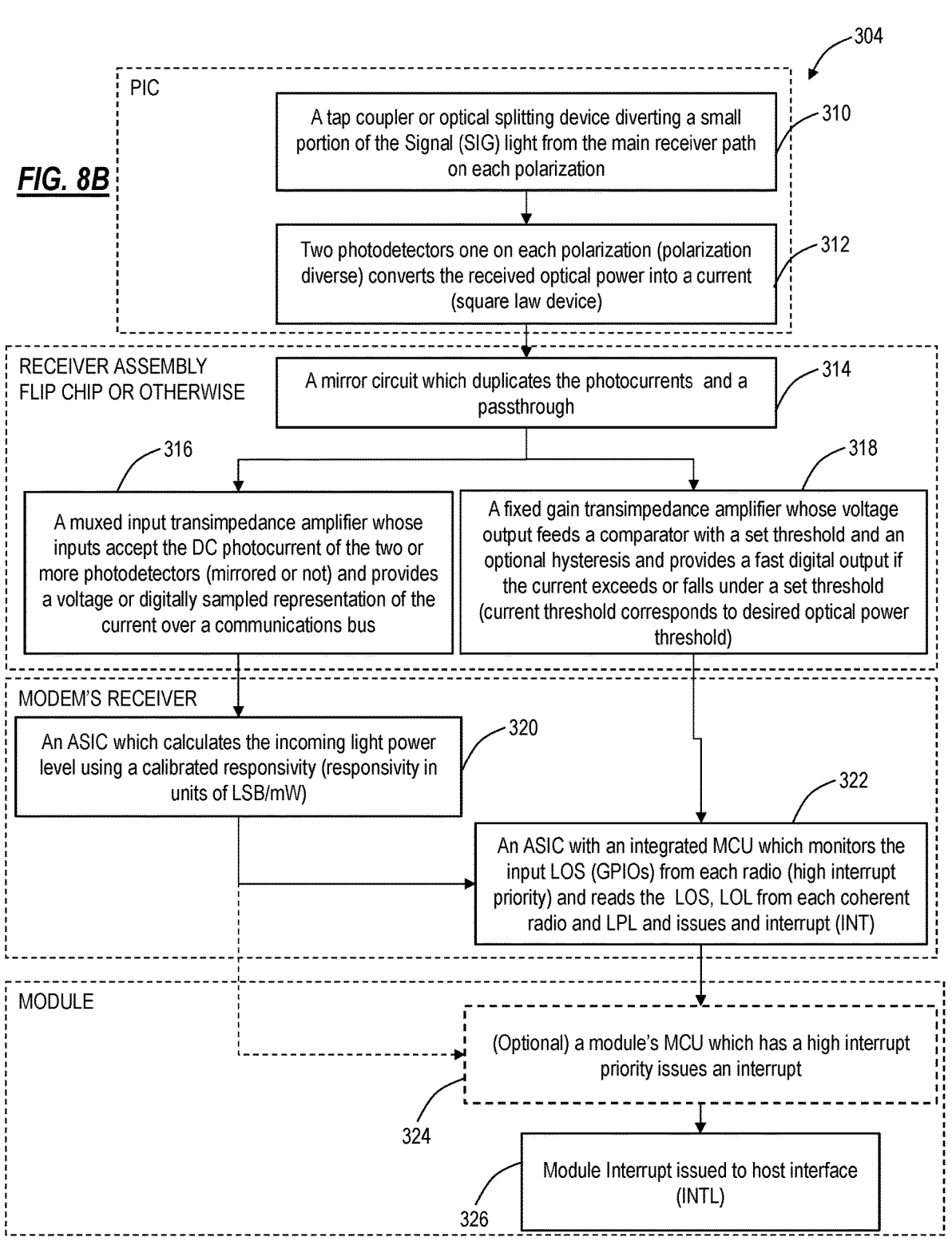

FIG. 7 is a logical view of components in the 2x800LR receiver 32 for implementing various functions therein, including the fast LOS detection. FIGS. 8A to 8B are flow diagrams of a fast LOS detection process 300 implemented in the 2x800LR receiver 32, as well as illustrating the associated components performing such functions. The 2x800LR receiver 32 includes a 2 X silicon photonics chip, a receiver assembly flip chip or the like, the 2 X modem's receiver, and the module itself, connected to the host device 12. The fast LOS detection process 300 includes the ICR which is a Dual ICR accepting both two signal inputs and a local oscillator (LO) input (may be dual) (step 302), and then proceeds to a parallel path detection 304, illustrated in FIG. 8B, and main path detection 306, illustrated in FIG. 8C.

With reference to FIG. 8B, the parallel path detection 304 includes a tap coupler or optical splitting device diverting a small portion of the signal inputs from the main receiver path on each polarization (step 310), and two photodetectors, one on each polarization (polarization diverse), converting the received optical power into a current (square law device) (step 312). Next, a mirror circuit duplicates the photocurrents and provides a passthrough (step 314).

One of the outputs of the duplicated photocurrent of step 314 is provided to a muxed input transimpedance amplifier whose inputs accept the DC photocurrent of the two or more photodetectors (mirrored or not) and provides a voltage or digitally sampled representation of the current over a communications bus (step 316). The other output is provided to a fixed gain transimpedance amplifier whose voltage output feeds a comparator with a set threshold and an optional hysteresis and provides a fast digital output if the current exceeds or falls under a set threshold (current threshold corresponds to desired optical power threshold) (step 318).

The output of step 320 is provided to the processing circuitry (ASIC) which calculates the incoming light power level using a calibrated responsivity (responsivity in units of LSB/mW) (step 320). The outputs of steps 318, 320 are used by the processing circuitry 18 with a MCU to monitor the input LOS for a high priority interrupt, e.g., a General-Purpose Input-Output (GPIO), which reads the LOS, LOL, and LPL and issues an interrupt (step 322). Optionally, the MCU has a high interrupt priority issues an interrupt (step 324). Finally, based on the fast LOS, the module interrupt is issued to the host device (step 326).

Figure 8C:
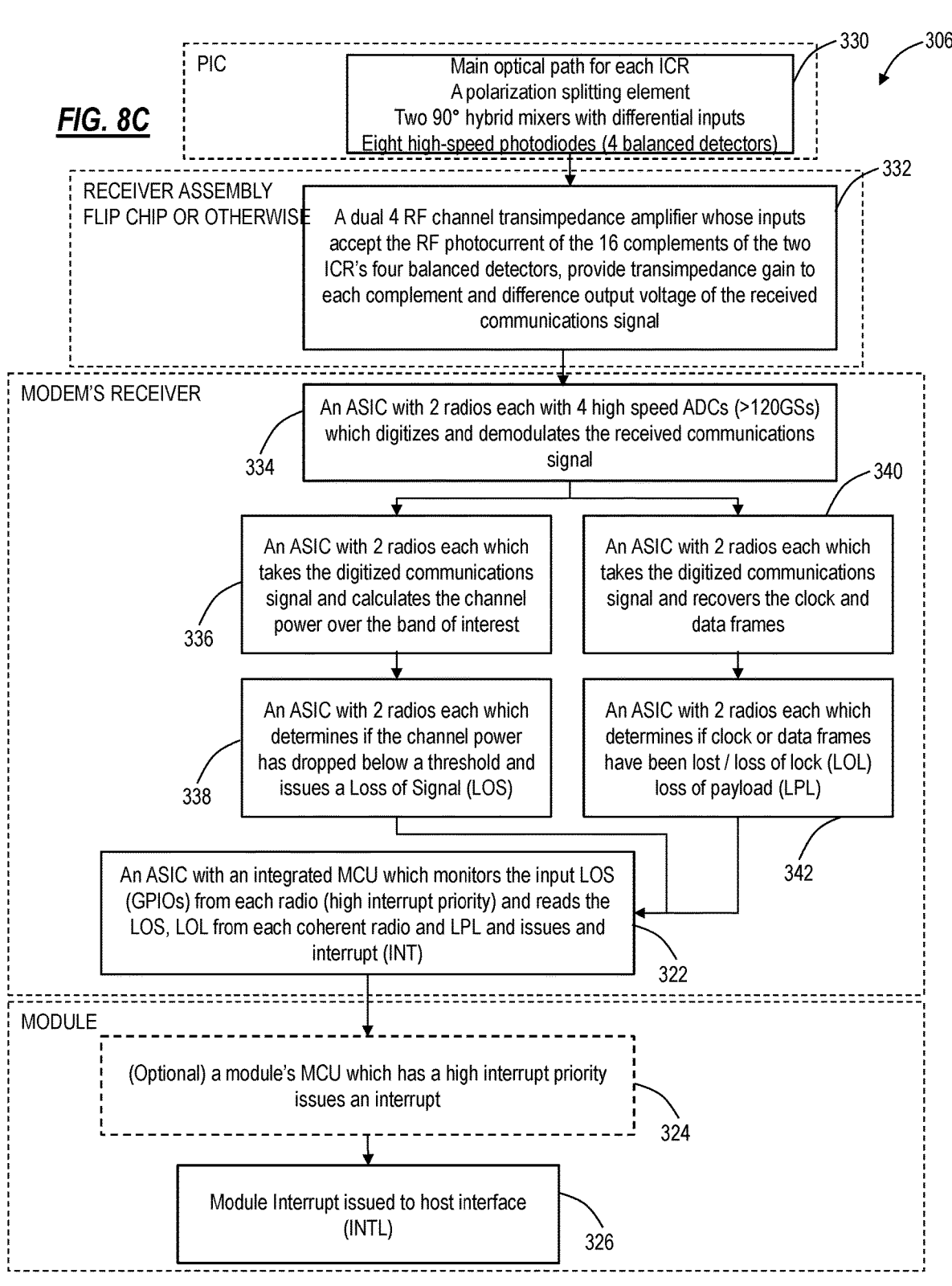

With reference to FIG. 8C, the main path detection 306 includes a main optical path for each ICR, with a polarization splitting element, two 90° hybrid mixers with differential inputs, and eight high-speed photodiodes (4 balanced detectors) (step 330), in the silicon photonics. Next, a dual 4 RF channel transimpedance amplifier whose inputs accept the RF photocurrent of the 16 complements of the two ICR's four balanced detectors, provide transimpedance gain to each complement and difference output voltage of the received communications signal (step 332).

In the modem's receiver, the processing circuitry with 2 radios each with 4 high speed ADCs (e.g., >120 GSs) digitizes and demodulates the received communications signal (step 334). The processing circuitry takes the digitized communications signal and calculates the channel power over the band of interest (step 336), and the processing circuitry determines if the channel power has dropped below a threshold and issues a Loss of Signal (LOS) (step 338). Also, after the step 334, the processing circuitry takes the digitized communications signal and recovers the clock and data frames (step 340), and the processing circuitry determines if clock or data frames have been lost/loss of lock (LOL) loss of payload (LPL) (step 342). Subsequent to steps 338, 342, the main path detection 306 proceeds to step 322.

Process

Figure 9:
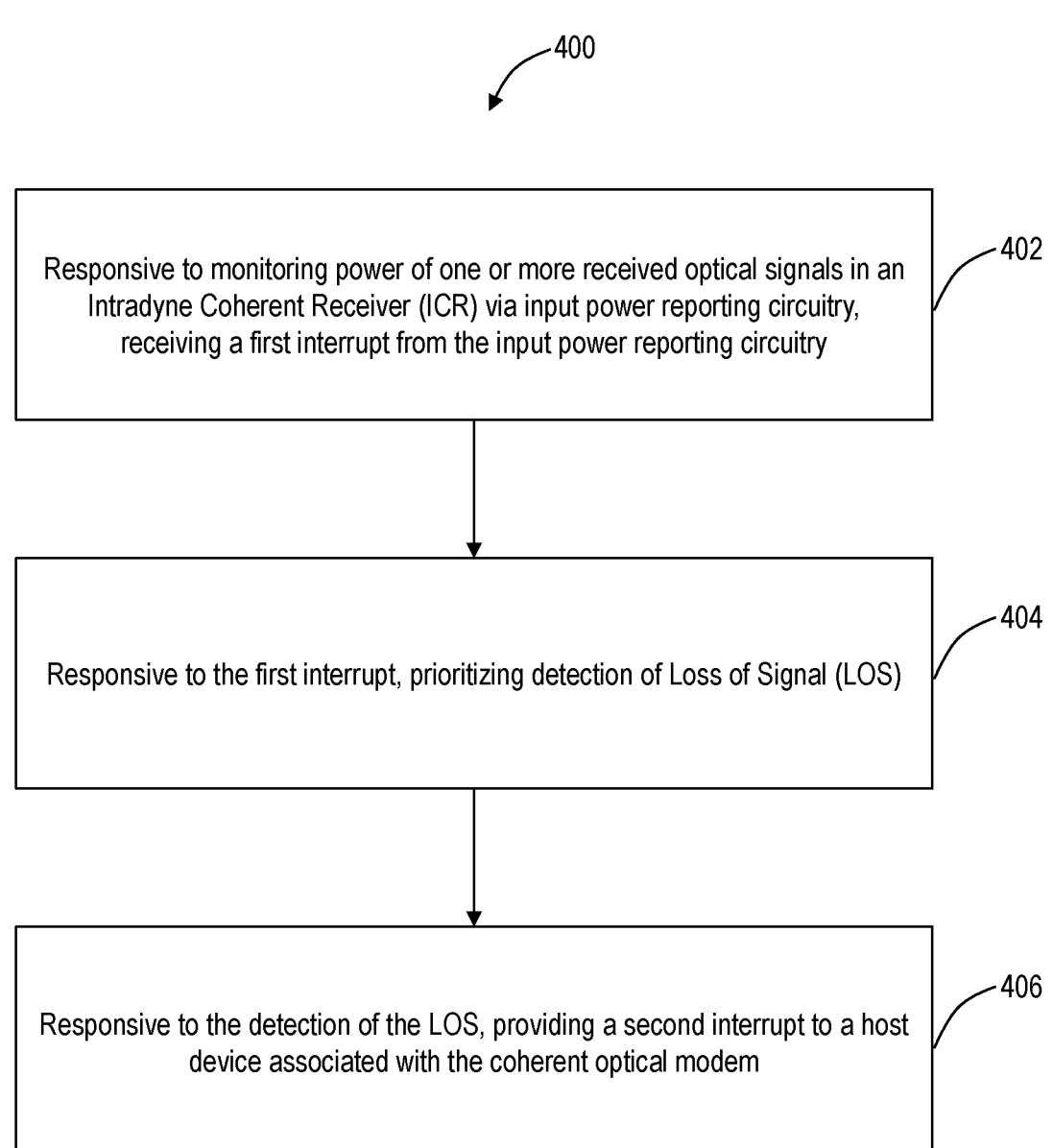
FIG. 9 is a flowchart of a process, implemented by processing circuitry in a coherent optical modem, for fast LOS detection.

FIG. 9 is a flowchart of a process 400, implemented by processing circuitry 18 in a coherent optical modem 10, for fast LOS detection. The process 400 includes, responsive to monitoring power of one or more received optical signals in an Intradyne Coherent Receiver (ICR) via input power reporting circuitry, receiving a first interrupt from the input power reporting circuitry (step 402); responsive to the first interrupt, prioritizing detection of Loss of Signal (LOS) (step 404); and, responsive to the detection of the LOS, providing a second interrupt to a host device associated with the coherent optical modem (step 406).

The process 400 can further include detecting the LOS on a main detection path, which is after Analog-to-Digital Conversion (ADC) and with communication over a bus, the first interrupt from the input power reporting circuitry providing a parallel detection path that is faster than the main detection path. The parallel detection path includes the second interrupt being provided within 1 ms of the LOS.

Coherent Optical Modem with Fast LOS Detection

In another embodiment, a coherent optical modem 10 includes an Intradyne Coherent Receiver (ICR) 14 with input power reporting circuitry 40, 100 configured to monitor one or more received optical signals; and processing circuitry 18 communicatively coupled to the ICR 14 and configured to receive a first interrupt 24 from the input power reporting circuitry 40, 100 based on the input power reporting circuitry 40, 100 monitoring the one or more received optical signals, responsive to the first interrupt 24, prioritize detection of Loss of Signal (LOS) in the processing circuitry 18, and, responsive to the detection of the LOS, provide a second interrupt 22 to a host device 12 associated with the coherent optical modem 10.

The processing circuitry 18 can be further configured to detect the LOS on main detection path, which is after Analog-to-Digital Conversion (ADC) and with communication over a bus, the first interrupt from the input power reporting circuitry 40, 100 providing a parallel detection path that is faster than the main detection path. The parallel detection path includes the second interrupt 22 being provided within 1 ms of the LOS.

The input power reporting circuitry 40, 100 can include current mirrors, transimpedance amplifiers, and comparators. The input power reporting circuitry 40, 100 can be further configured for optical power reporting from the ICR. The input power reporting circuitry 40, 100 can include current mirrors to duplicate photocurrent for use in the optical power reporting and raising the first interrupt 24.

The one or more received optical signals can include dual polarization signals with an X and Y polarization. The input power reporting circuitry 40, 100 can monitor each of the X and Y polarization. The first interrupt 24 can include an X polarization LOS interrupt and a Y polarization LOS interrupt, and the processing circuitry 18 can be configured to prioritize the detection of the LOS based accordingly, i.e., detection on the X polarization when the X polarization LOS interrupt is raised.

CONCLUSION

In addition to the circuitry described herein, it will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A coherent optical modem comprising:
an Intradyne Coherent Receiver (ICR) with input power reporting circuitry configured to monitor one or more received optical signals; and processing circuitry communicatively coupled to the ICR and configured to
receive a first interrupt from the input power reporting circuitry based on the input power reporting circuitry monitoring the one or more received optical signals,
responsive to the first interrupt, prioritize detection of Loss of Signal (LOS) in the processing circuitry, including detecting the LOS on a main detection path, which is after Analog-to-Digital Conversion (ADC) and with communication over a bus, the first interrupt from the input power reporting circuitry providing a parallel detection path that is faster than the main detection path, and
responsive to the detection of the LOS, provide a second interrupt to a host device associated with the coherent optical modem.

2. The coherent optical modem of claim 1, wherein the parallel detection path includes the second interrupt being provided within 1 ms of the LOS.

3. The coherent optical modem of claim 1, wherein the input power reporting circuitry includes current mirrors, transimpedance amplifiers, and comparators.

4. The coherent optical modem of claim 1, wherein the input power reporting circuitry is further configured for optical power reporting from the ICR.

5. The coherent optical modem of claim 4, wherein the input power reporting circuitry includes current mirrors to duplicate photocurrent for use in the optical power reporting and raising the first interrupt.

6. The coherent optical modem of claim 1, wherein the one or more received optical signals include dual polarization signals with an X and Y polarization.

7. The coherent optical modem of claim 6, wherein the input power reporting circuitry monitors each of the X and Y polarization.

8. The coherent optical modem of claim 6, wherein the first interrupt includes an X polarization LOS interrupt and a Y polarization LOS interrupt, and the processing circuitry is configured to prioritize the detection of the LOS based accordingly.

9. The coherent optical modem of claim 1, wherein the coherent optical modem is in a pluggable module and the second interrupt is provided to the host device via a hardware pin or fast communication bus, for network protection applications by the host device.

10. A method, implemented by processing circuitry in a coherent optical modem, comprising steps of:
responsive to monitoring power of one or more received optical signals in an Intradyne Coherent Receiver (ICR) via input power reporting circuitry, receiving a first interrupt from the input power reporting circuitry;
responsive to the first interrupt, prioritizing detection of Loss of Signal (LOS), including detecting the LOS on a main detection path, which is after Analog-to-Digital Conversion (ADC) and with communication over a bus, the first interrupt from the input power reporting circuitry providing a parallel detection path that is faster than the main detection path; and
responsive to the detection of the LOS, providing a second interrupt to a host device associated with the coherent optical modem.

11. The method of claim 10, wherein the parallel detection path includes the second interrupt being provided within 1 ms of the LOS.

12. The method of claim 10, wherein the input power reporting circuitry includes current mirrors, transimpedance amplifiers, and comparators.

13. The method of claim 10, wherein the input power reporting circuitry is further configured for optical power reporting from the ICR.

14. The method of claim 13, wherein the input power reporting circuitry includes current mirrors to duplicate photocurrent for use in the optical power reporting and raising the first interrupt.

15. The method of claim 10, wherein the one or more received optical signals include dual polarization signals with an X and Y polarization.

16. The method of claim 15, wherein the input power reporting circuitry monitors each of the X and Y polarization.

17. The method of claim 15, wherein the first interrupt includes an X polarization LOS interrupt and a Y polarization LOS interrupt, and the prioritizing the detection of the LOS based accordingly.

18. The method of claim 10, wherein the coherent optical modem is in a pluggable module and the second interrupt is provided to the host device via a hardware pin or fast communication bus, for network protection applications by the host device.

\* \* \* \* \*